(No Model.)

D. COLLINS & W. H. WALLIS.
WHEEL FOR CYCLES.

No. 583,891. Patented June 8, 1897.

Witnesses
E. A. Bullock
B. H. Miller

Inventors
David Collins
William H. Wallis
By Their Attorneys
Buldwin, Davidson & Wight

UNITED STATES PATENT OFFICE.

DAVID COLLINS AND WILLIAM HENRY WALLIS, OF SOUTHAMPTON, ENGLAND.

WHEEL FOR CYCLES.

SPECIFICATION forming part of Letters Patent No. 583,891, dated June 8, 1897.

Application filed November 13, 1896. Serial No. 611,962. (No model.)

*To all whom it may concern:*

Be it known that we, DAVID COLLINS, commercial clerk, residing at 2 Sussex Road, and WILLIAM HENRY WALLIS, cycle-maker, residing at 40 Northam Road, Southampton, in the county of Hampshire, England, subjects of the Queen of Great Britain, have invented certain new and useful Improvements in Wheels for Cycles and other Vehicles, of which the following is a specification.

According to this invention a pneumatic tube and a cover having spring edges are employed in conjunction with a trough-shaped rim having its edges turned inward to form hooks. The length of the spring edges of the cover is such that before the inflation of the pneumatic tube commences they lie at the bottom of the trough, but by the inflation they are stretched and forced outward, keeping in contact with the sides of the trough until they reach and are secured by the hooked rim. By making the cover of sufficient thickness and forming shoulders upon it the arrangement is rendered suitable for use either as a pneumatic or as a cushioned tire, the springs when the pneumatic tube is deflated or absent drawing the cover into the trough until its shoulders rest upon the edges of the rim. By this means the accidents commonly caused by the puncture of the pneumatic tube are avoided.

Figure 1:
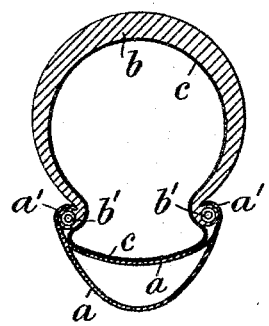
Figure 2:
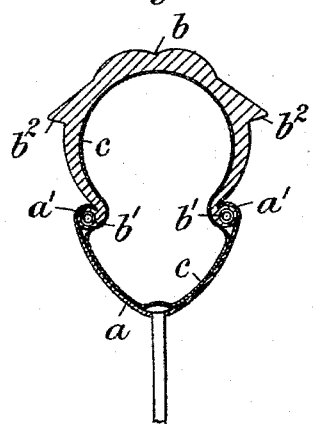
Figure 3:
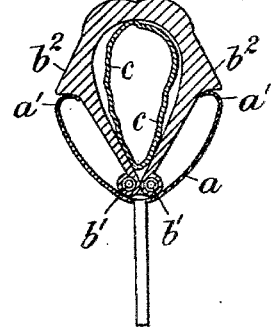

Figure 1 is a transverse section of a wheel made according to this invention. Figs. 2 and 3 are similar views of a modification, the tire in Fig. 2 being inflated and in Fig. 3 deflated.

$a$ is a trough-shaped metal rim having its edges turned over to form hooks $a'$.

$b$ is an outer tire or cover formed, as usual, of substantially inextensible material, such as canvas covered with india-rubber, and $b'$ are springs embedded in or fixed to its edges. The springs $b'$ are preferably continuous helical wire springs extending all round.

$c$ is an internal pneumatic tube of ordinary construction.

$b^2$, Figs. 2 and 3, are shoulders formed on the cover $b$, which when the tube $c$ is deflated are pulled, by the springs $b'$, down on to the hooks $a'$, as shown in Fig. 3.

What we claim is—

1. The combination of a concave trough-shaped rim having inwardly-turned hooks at its edges, an outer tire or cover, helical springs at its edges held under tension when in the hooks, and whose unstretched length is not greater than the smallest circumference of the inside of the rim, so that when the tire is deflated the edges automatically move to a central position in the rim, and an inner pneumatic tube bearing when inflated upon the inside of the trough and pressing the spring edges of the tire into the hooks.

2. The combination of a trough-shaped rim, hooks at its edges, an outer tire or cover, springs at its edges, shoulders on it and an inner pneumatic tube, the shoulders being so placed that when the tube is deflated they rest on the hooks.

3. The combination of a trough-shaped rim, hooks at its edges, an outer tire or cover having beaded edges, shoulders on the tire between its tread and the edges, and means for inflating and deflating the tire to cause the beaded edges to enter the hooks or to permit the shoulders on the tire to rest on the hooks, substantially as described.

DAVID COLLINS.
WILLIAM HENRY WALLIS.

Witnesses:
ALBERT LOWE,
F. G. OAKLEY.